May 18, 1954 E. BARANY 2,678,971

MAGNETIC RECORDING OR REPRODUCING HEAD MOUNT

Filed Sept. 12, 1950 3 Sheets-Sheet 1

Edmund Barany
INVENTOR.

BY Harry L. Kosten
James B. Boyer
Attorneys

May 18, 1954 E. BARANY 2,678,971

MAGNETIC RECORDING OR REPRODUCING HEAD MOUNT

Filed Sept. 12, 1950 3 Sheets-Sheet 2

Edmund Barany
INVENTOR.

BY [signature]
[signature]
Attorneys

May 18, 1954 E. BARANY 2,678,971

MAGNETIC RECORDING OR REPRODUCING HEAD MOUNT

Filed Sept. 12, 1950 3 Sheets-Sheet 3

Edmund Barany
INVENTOR.
BY Henry K. Kratz
James B. Boyce
Attorneys

Patented May 18, 1954

2,678,971

UNITED STATES PATENT OFFICE 2,678,971

MAGNETIC RECORDING OR REPRODUCING HEAD MOUNT

Edmund Barany, Chicago, Ill., assignor to Ampro Corporation, Chicago, Ill., a corporation of Illinois Application September 12, 1950, Serial No. 184,418

3 Claims. (Cl. 179—100.2)

The present invention relates to mounting structure for a magnetic head used for purposes of recording and/or reproduction, by cooperation between an axially travelling elongate body of magnetizable material and a head including a magnetic circuit provided with a gap across and closely adjacent which such record body passes. For best results it is highly desirable that in all instruments a universal angular relation exists between the longitudinal axis of the record body path where it crosses the gap and the adjacent edges of the opposite gap-defining surfaces, in other words a preselected angular relation between the longitudinal axis of the record path and the median plane of the gap. More particularly the invention is directed to mounting structure for a head that permits angular adjustment of the head to bring the gap into the selected angular relation with the path axis. Hereinafter this type of adjustment is referred to as "azimuth adjustment." A convenient standard relation between the record body and gap is perpendicularity, and that relation is assumed in the following disclosure.

A primary object of the invention is the provision of a novel type of magnetic head mount providing for azimuth adjustment of a head that it supports.

Another object is the provision of a novel type of magnetic head mount that provides azimuth adjustment of a head supported by it with high accuracy, but that is capable of quick and simple adjustment without requiring a high degree of skill, training or technical knowledge.

Still another object is the provision of a novel magnetic head mount providing for an adjustment of a head that it supports, that is very simple and inexpensive to manufacture, assemble and install in a magnetic recording and/or reproducing instrument.

Figure 1:
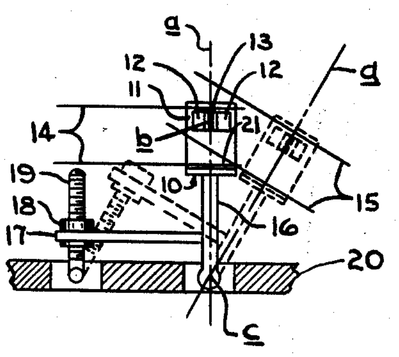
Fig. 1 is an extremely schematic and greatly exaggerated front elevation disclosing fundamental principles of the invention.

Describing the drawings in detail and first referring to the highly schematic Fig. 1, a magnetic recording and/pickup head 10 comprises a core of highly permeable magnetic material, which is arranged to provide a pair of pole pieces 11 having oppositely facing surfaces 12 separated by a gap 13. The median plane of the gap, designated *a*, extends through the gap midway between the surfaces 12 that define it and a central axis *b* of gap 13 lies in plane *a*. The path of an elongate record body of magnetizable material, considered throughout the present specification to be of the well known tape but which equally might be wire, is indicated by lines 14. It will be seen that as shown in solid lines in Fig. 1, the median gap plane *a* coincides with the transverse or normal plane of the record path, in other words the gap or its median plane may be said to be perpendicular to the longitudinal axis of the record body path across the gap. Such is herein considered the ideal standard relation between the record path and the gap of the magnetic head circuit. Due to such causes of variation from instrument to instrument as may arise from manufacturing tolerances, there may be substantial variances from the desirably standard angular relation between the gap and the longitudinal axis of the record body path across it. Such a condition is suggested in tremendously exaggerted form by lines 15. The prior art practice for azimuth adjustment of head structures to compensate such a condition has been to support the head for adjustment rotation about axis *b*. Structures for accomplishing this type of adjustment have been complicated and expensive. Additionally the angular adjustments necessary to compensate the very small variances encountered in actual practice are so fine as to render it difficult and time consuming and to require a substantial degree of skill to adjust such prior art structures.

The present invention avoids complex and expensive structure and time-consuming and difficult adjustment by providing for arcuate swinging or tilting adjustment of the head structure about a pivot axis that is spaced from, but parallel to the median axis *b* of the gap. Such a pivot axis in Fig. 1 is designated *c*. To accomplish azimuth adjustment of the head 10, to correct the misalignment condition suggested by lines 15, the head is swung or rocked about axis *c* until plane *a* coincides with the plane extended normal to the record body path across the gap. Such head position is represented in dotted lines in Fig. 1.

Obviously a great variety of structures may be employed for effecting adjustments of such structures. Thus the arrangements of Fig. 1 for supporting the head and accomplishing adjustment thereof are schematically shown and are purely illustrative. Support for the head is disclosed as a member 16 projecting from the head in general alignment with the median gap plane *a* and that is pivoted to swing or rock about axis *c*, thereby to move head 10 in an arcuate path, in various positions along which the gap has different angular relations to the record body path. Adjusting mechanism is shown as a lever-providing arm member 17, projecting from member 16 in a direction extended laterally of axis *c*, the two members 16, 17 in effect providing a bell crank assembly. Mechanism for swinging this assembly may comprise such adjustable means as a tapped rotatable collar 18 threaded on a screw shaft 19 and engaged with member 17. Shaft 19 and the lever assembly 16, 17 may be both supported by base structure 20 comprising a part of the recording and/or reproducing instrument. A conventional arrangement for accommodating change in axial disposition of shaft 19 during its swinging may comprise pivoted mounting of shaft 19 to the base structure 20.

It will be noted that the type of head azimuth adjustment disclosed by Fig. 1 results in movement of the head gap in directions extended transverse to the record path. To minimize lateral movement of the gap relative to the record path, vertical as seen in Fig. 1, the pivot axis about which the head swings preferably is spaced from the path in a direction extended at right angles to it, and lies in the plane *a*. For proper registration of a record body with the gap in an adjusted position of the head guide, means mounted on and moving with the head and the head-supporting assembly may be provided. In Fig. 1 a ledge 21 projecting forward from the plane of the record body path and located at one edge of such path provides for proper registration of a record body with the gap defined by the pole piece surfaces 12. In practice, lateral shift of the path consequent to azimuth adjustment is so small as to present no practical difficulty in accomplishing correct registration of a record body with the gap.

Figure 4:
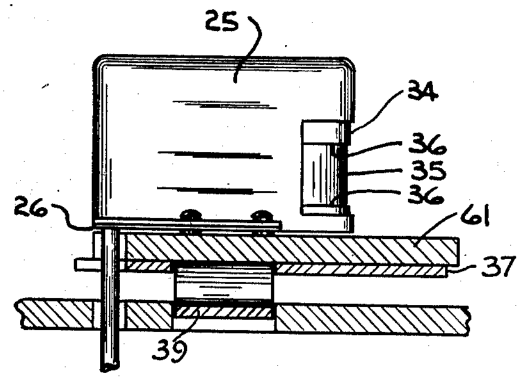
Fig. 4 is a section on line 4—4 of Fig. 3.
Figure 5:
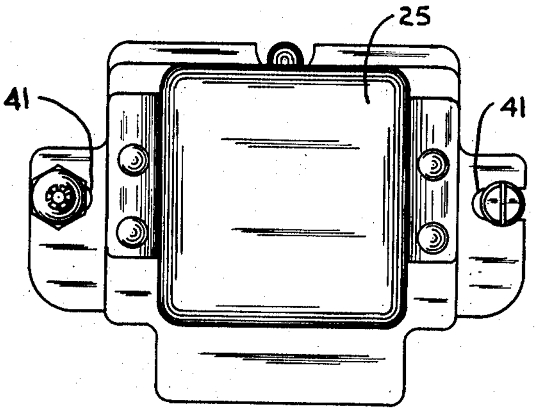
Fig. 5 is a top plan of the assembly of Fig. 3.
Figure 3:
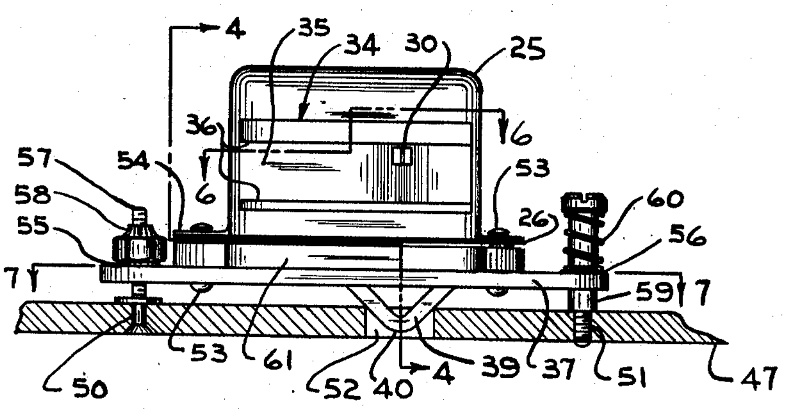
Fig. 3 is a front view showing in elevation a commercially available form of the magnetic head, and a mounting for such head embodying the invention.
Figure 6:
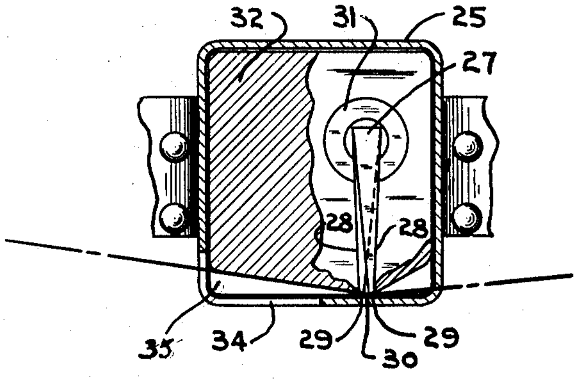
Fig. 6 is a horizontal section on line 6—6 of Fig. 3.

Figs. 3 to 7 disclose a practical embodiment of the invention, the magnetic head therein shown being of a form commercially available, in one particular being slightly modified for purposes of the invention, specifically to provide a registration guide for record bodies. The head comprises a casing shield of material of high magnetic permeability such shield comprising a head-surrounding can 25 and a bottom plate 26. The head proper comprises, as best shown in Fig. 6, a magnetically permeable core 27 that is arranged with pole pieces 28 having surfaces 29 spaced apart to provide the gap 30. In the type of head shown, the core and the winding 31 that energizes it are enclosed in a molded body 32 of insulating material, such as resin or plastic, with only the end surfaces 33 of the pole pieces exposed through the front surface of body 32 at the record path. Such path is extended through an opening 34 in the casing can 25. The means illustrated for providing a guide to transversely position a record body in proper registration with gap 30 and core piece surface 32, in a vertical direction as seen in Figs. 3 and 4, comprises a slot 35 milled into the front surface of body 32. The top and bottom surfaces 36 provided by this slot serve as edge guides for a tape record body trained through the slot.

Figure 7:
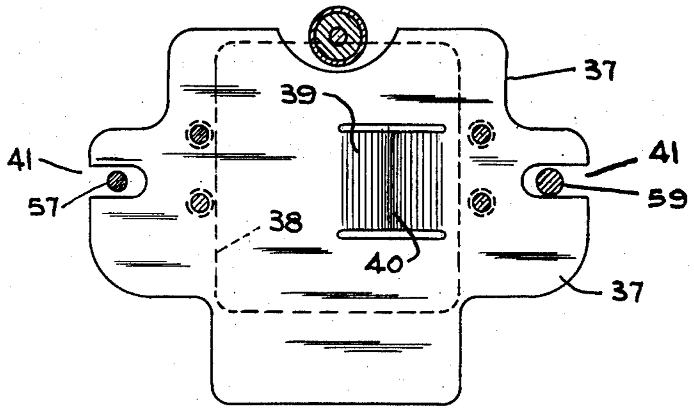
Fig. 7 is a horizontal section on line 7—7 of Fig. 3.

For purposes of the invention the head and its shield are mounted on a plate 37 that is arranged for assembly with an instrument structure, to tilt about a pivot axis properly disposed to accomplish azimuth adjustment in accordance with the invention. This plate, shown in plan in Fig. 7 comprises an area, defined by dotted lines 38 in Fig. 7, which the head and shield assembly overlies when mounted on the plate and beyond which the plate extends on both sides in the directions of the record path of such an instrument. To provide a simple and inexpensive bearing structure to permit this tilting, a part of the plate area underlying the head is deformed to provide a V-shaped projection 39, extended from the plate body from the side opposite that on which the head is mounted. Projection 39 is so formed and located that its apex 40 lies substantially in the median plane of the magnet gap 30. As best shown in Figs. 3 and 7 the end portions of the plate, beyond the area that the head overlies, are provided with notches 41 for receiving securing means.

Figure 2:
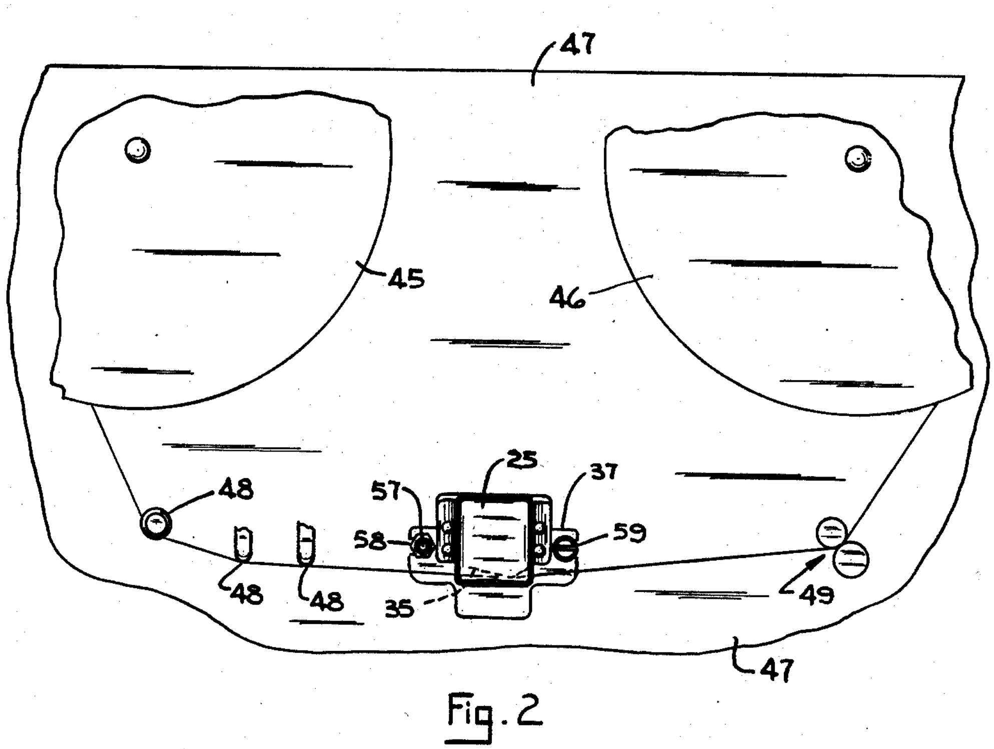
Fig. 2 is a top plan of an instrument provided with the invention.

The assembly of the plate with a magnetic recording and/or reproducing instrument is best shown in Figs. 2, 3 and 4. The instrument shown in Fig. 2 is provided with supports for dismountable supply and takeup reel 45, 46, and with a cover plate 47, which also is partially shown in Figs. 3 and 4, which underlies such reels when mounted and supports record body guide means 48 that together with head 25, determine the path of a record body between them. A capstan and pinch roll assembly 49 is arranged to advance a record body in such path.

Cover plate 47 is provided with fastener-receiving holes 50, 51 spaced to underlie the notches 41 of mounting plate 37, and a rectangular opening 52 for partial reception of mounting plate projection 39. These holes 50, 51 and the opening 52 are so located relative to guide means 48 and the record body path determined by them, that a head mounted on plate 37 when assembled with the cover plate 47 occupies a position wherein its gap is correctly located alongside the path for cooperation with a record body travelling in the path. For proper spacing of the gap from the surface of cover plate 47, a pad 61 of proper thickness may be interposed between mounting plate 37 and the head. The whole head, pad and mounting plate assembly may be secured together by rivets 53 that penetrate a bottom, outwardly turned flange 54 of the shield can 25, the marginal portion of the bottom shield 26 the pad 61 and the mounting plate 37.

Contact of opposite inclined surfaces of V-shaped projection 39 with opposite edges of opening 52 provides rocking support for plate 37 and a head mounted on it, for arcuate movement of the head and change of the angular disposition of head gap 30 relative to the longitudinal axis of the record body path. The pivot axis about which such arcuate movement occurs lies substantially in the median plane of the gap and is spaced from the gap toward the instrument cover plate 47 in the general manner schematically disclosed by Fig. 1. Fastening of the head mount afforded by plate 37, and adjustment of its angular position and that of a head secured to it relative to instrument plate 47 and the longitudinal axis of the record path is accomplished by the means shown in Figs. 3 and 5.

Washers 55, 56 respectively bear on the upper surface of plate 37 adjacent notches 41. At one end of the plate a threaded stud 57, rigidly mounted in hole 50, extends outward from the plate and through washer 55, and a lock nut 58 is threaded on stud 57 above the washer. At the other end of plate 37 a mounting bolt 59 is extended through washer 56 and screwed into hole 51, which is threaded. A compression spring 60 is interposed between the head of bolt 59 and the washer 56, to urge the end of the plate 37 toward the instrument cover plate 47. Movement of nut 58 axially of stud 57 serves to tilt the plate about the fulcrum provided by contact of projection 39 with the edges of opening 52 thereby swinging the head gap 30 arcuately in the manner described.

It is to be noted that the location of stud 57 relative to mounting plate projection 39 is such that the adjustably movable point of the lever arm provided by the portion of plate 37 between projection 39 and stud 57 is spaced from the fulcrum point a distance substantially greater than the distance of gap 30 from the fulcrum point. By this relative spacing of the adjusting point and adjusted point from the fulcrum axis, a relatively long travel of nut 58 produces a quite fine adjustment of the angular position of the gap and a very fine adjustment of its angular disposition relative to the longitudinal axis of the record path. Practical azimuth adjustment on mass production assembly lines may advantageously be accomplished by metering the magnitude of characteristic distortion produced by azimuth misadjustment in reproduction from a standard test recording, and by tilting the head to the position productive of minimum magnitude of such distortion. The fine angular adjustment of the head gap accomplished by relatively coarse adjustment of nut 58 makes proper adjustment by observation of a distortion magnitude indicating instrument simple and quickly and readily accomplished by personnel without great skill or technical knowledge. Thus the employment of a lever arm for accomplishing azimuth adjustment of an instrument of the kind in question forms an important aspect of the present invention.

From the foregoing, the basic nature and principles of the invention will be apparent, and it is evident that changes in the specific structural details may be resorted to without departing from the invention as defined by the claims.

I claim:

1. A mount for a head that includes magnetic circuit means providing a gap, for assembling such a head with an instrument provided with means for moving an elongate record body of magnetizable material in a predetermined path, to position such a head with its gap in proper registration with the record body path and to provide azimuth adjustment of such head to position its gap in perpendicular relation to the longitudinal axis of the record path across it; said mount comprising a plate, means for securing such a head in a preselected position overlying one surface of a portion of said plate and with the median plane of its gap disposed in substantially right angular relation to said plate surface, a substantially V-shaped portion of said plate projecting from the opposite side of said plate portion with its apex disposed to lie substantially in the median plane of the gap of a head so secured.

2. A mount for a head that includes magnetic circuit means providing a gap, for assembling such a head with an instrument provided with means for moving an elongate record body of magnetizable material in a predetermined path, to position such a head with its gap in proper registration with the record body path and to provide azimuth adjustment of such head to position its gap in perpendicular relation to the longitudinal axis of the path across it; said mount comprising a generally flat plate, means for securing such a head to said plate in a preselected position with the median plane of its gap disposed in substantially right angular relation to one surface of the plate, a substantially V-shaped portion of said plate projecting from the plane of the plate on the side opposite said surface and with its apex disposed to lie substantially in the median plane of the gap of a head so secured, said plate being extended beyond the margins of the position of a head so secured in the directions of travel of a record body and being arranged for cooperation with means for securing the mount to such an instrument with said projecting plate portion in rocking contact with the structure of such instrument.

3. In a magnetic recording and/or reproducing instrument provided with a cover plate and means for axially moving an elongate record body of magnetizable material in a predetermined path adjacent a surface of said cover plate; an assembly comprising a head mounting plate having between its ends a V-shaped portion projecting beyond one of its surfaces, a head having magnetic circuit means providing a gap defined between surfaces of said circuit means spaced in the direction in which said path extends, said head being secured to said mounting plate with its median plane substantially aligned with the apex of said V-shaped plate portion, said cover plate having a parallel sided opening into which said projection extends with its opposite inclined surfaces in movable contact with the opposite side edges of said opening to provide a tilt bearing for said plate and head, said opening being located to position said head with its gap alongside said path, and means at opposite ends of said mounting plate securing it to said cover plate and for changing the angular position of the mounting plate and head relative to the longitudinal axis of said path by tilting the mounting plate on such bearing.

References Cited in the file of this patent

UNITED STATES PATENTS

| Number | Name | Date |
|---|---|---|
| 2,560,569 | Hare | July 17, 1951 |

FOREIGN PATENTS

| Number | Country | Date |
|---|---|---|
| 676,810 | Germany | June 12, 1939 |
| 873,535 | France | Mar. 30, 1942 |